United States Patent
Goh et al.

(10) Patent No.: US 12,524,082 B1
(45) Date of Patent: Jan. 13, 2026

(54) INFORMATION HANDLING SYSTEM KEYBOARD WITH ILLUMINATION RECYCLING

(71) Applicant: Dell Products L.P., Round Rock, TX (US)

(72) Inventors: Peng Lip Goh, Singapore (SG); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/892,914

(22) Filed: Sep. 23, 2024

(51) Int. Cl.
  *G06F 3/02* (2006.01)
  *G06F 1/26* (2006.01)
  *H01H 13/83* (2006.01)

(52) U.S. Cl.
  CPC .............. *G06F 3/0202* (2013.01); *G06F 1/26* (2013.01); *H01H 13/83* (2013.01)

(58) Field of Classification Search
  None
  See application file for complete search history.

(56) References Cited

U.S. PATENT DOCUMENTS

| | | | |
|---|---|---|---|
| 8,173,893 B2 | 5/2012 | Huang | |
| 9,743,357 B2 | 8/2017 | Tabe | |
| 10,811,201 B1 | 10/2020 | Files et al. | |
| 10,983,570 B1 | 4/2021 | Files et al. | |
| 2011/0298718 A1* | 12/2011 | Chang | G06F 3/04886 345/173 |
| 2012/0103384 A1 | 5/2012 | Hsieh et al. | |
| 2016/0306437 A1* | 10/2016 | Zhang | G06F 1/1662 |
| 2018/0374977 A1* | 12/2018 | Geerligs | H10F 77/223 |
| 2019/0058242 A1 | 2/2019 | Tabe | |
| 2020/0328050 A1* | 10/2020 | Files | G06F 1/1662 |
| 2024/0012365 A1* | 1/2024 | Hurtta | G04G 21/08 |

* cited by examiner

*Primary Examiner* — Aneeta Yodichkas
(74) *Attorney, Agent, or Firm* — Zagorin Cave LLP; Robert W. Holland

(57) ABSTRACT

An information handling system keyboard backlight illuminates the underside of the keyboard keys with light emitting diodes (LEDs) coupled to a circuit board in a central region of a light spreader that accepts the illumination and distributes the illumination across the underside of the keys and through translucent values of the plural keys. A photovoltaic panel below the light spreader receives light that is not directed at the keys to convert the light to a current that is applied to charge a battery of the keyboard.

20 Claims, 9 Drawing Sheets

INFORMATION HANDLING SYSTEM KEYBOARD WITH ILLUMINATION RECYCLING

BACKGROUND OF THE INVENTION

Field of the Invention

The present invention relates in general to the field of information handling system keyboards, and more particularly to an information handling system keyboard with illumination recycling.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process information with processing components coupled in a housing, such as a central processing unit (CPU) and random access memory (RAM) that cooperate to execute instructions that process information. Stationary information handling systems, such as desktops and towers, build the processing components in a stationary housing to interact with end users through peripheral devices, such as a peripheral keyboard, mouse and display. Portable information handling systems integrate processing components, a keyboard, a display and a power source in a portable housing to support mobile operations. Portable information handling systems allow end users to carry a system between meetings, during travel, and between home and office locations so that an end user has access to processing capabilities while mobile. When in a fixed location, such as an office cubicle, portable information handling systems will typically interact through both integrated and peripheral devices, such as through a docking station that supports a display, keyboard and mouse. Generally, peripheral devices offer a more user friendly interface with a greater size and a layout that is not constrained by the portable housing footprint.

Peripheral keyboards tend to offer a more natural input experience than integrated keyboards. Peripheral keyboards can include a larger frame with a longer layout of keys that often includes function keys and a number pad. A peripheral keyboard frame can have an incline that aids end user typing and keys with a greater vertical travel that offers a more natural feedback to an end user for more rapid and accurate typing inputs than a typical integrated keyboard. Peripheral keyboards typically operate through either a cabled interface or a wireless interface. When a USB cable or an internal bus cable interfaces a keyboard with an embedded controller and CPU, power to detect key inputs through the keyboard matrix is typically provide from the information handling system power supply, such as through a USB power pin of a USB port and cable connector. When a keyboard interfaces with an information handling system through a wireless interface, the keyboard typically includes a wireless network interface controller (WNIC) with a radio that communicates key inputs, such as through BLUETOOTH. To support operation of the WNIC, the keyboard will typically include a battery, such as a rechargeable lithium ion battery.

One difficulty with keyboards is that the key values on each key are sometimes difficult to see in dark operating conditions. To help end users see the key values, some keyboards include a backlight below the keys that generate illumination directed out of the keys to light up the key values, such as with an etched or painted key value that has a transparent or translucent material extending to the bottom of the key. Backlights use a variety of techniques to direct the illumination towards an underside of the key. One common technique is to illuminate from a light emitting diode (LED) into a light guide that distributes the illumination across the underside of the keys so that reflectors in the light guide can direct the illumination towards the keys. Another technique is to distribute mini or micro LEDs below the keys with illumination directed towards the keys. One difficulty with the use of a keyboard backlight is that the LEDs tend to draw down battery power of the keyboard and/or the information handling system interfaced with the keyboard. Backlight battery drain reduces keyboard operation time and increases the amount charging to maintain the battery charge, thus increasing power use and carbon footprint. Within a keyboard interior, a relatively small amount of the light generated to illuminate the key values is actually passed through the key values.

SUMMARY OF THE INVENTION

Therefore, a need has arisen for a system and method which offers a more energy efficient keyboard.

In accordance with the present invention, a system and method are provided which substantially reduce the disadvantages and problems associated with previous methods and systems that manage power use and battery charge associated with a keyboard. A photovoltaic panel couples to the keyboard and interfaces with a power management unit to apply current generated by the photovoltaic panel to charge a battery of the keyboard. The photovoltaic panel generates charging current from a backlight interior to the keyboard, from light that illuminates an LCD included in the keyboard and/or from ambient light.

More specifically, an information handling system processes information with processing components included in a housing, such as a processor that executes instruction to process information and a memory that stores the instructions and information. An end user interacts with the processor through a keyboard having plural keys that each represent an input value. In one embodiment, the keyboard includes a backlight under the keys to illuminate the key bottom surfaces and thereby pass some illumination through a translucent symbol formed in the key. An illumination source to illuminate the key bottom surface includes a circuit with light emitting diodes (LEDs) that direct illumination into a light spreader to distribute the light evenly under the keyboard. A photovoltaic panel below the light spreader captures illumination that is not directed towards the keyboard and converts the illumination to a current that charges a battery of the keyboard. In another embodiment, a photovoltaic panel coupled over an LCD panel at the upper side keyboard has a semitransparent material that passes images of the LCD through to accept end user inputs and captures excess illumination from the LCD and from ambient light to generate a current that charges the keyboard battery. Another embodiment places photovoltaic panels on top of keys of the keyboard to convert ambient light into current that charges the battery through a contact under the key.

The present invention provides a number of important technical advantages. One example of an important technical advantage is that a keyboard backlight has reduced cost and improved power efficiency through harvesting of excess backlight that is used to charge a battery of the keyboard. The photovoltaic panel replaces a reflector typically found in conventional keyboard backlights with the amount of excess illumination harvested offering a greater efficiency than is available when a reflector is used to reduce illumination brightness. The photovoltaic panel placed over the LCD panel has a substantial footprint to collect ambient light when the LCD is used to present a function key row. Photovoltaic panels coupled to key upper surfaces collects ambient light without disrupting the conventional appearance and functionality of the keyboard. Charging the keyboard battery with a photovoltaic panel reduces the keyboard carbon footprint by reducing the power needed to charge the battery from external sources and reducing the size of the battery needed in the keyboard.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Photovoltaic panels included in an information handling system keyboard harvest internally-generated illumination, externally generated illumination or both to generate a current that charges a battery powering the keyboard. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
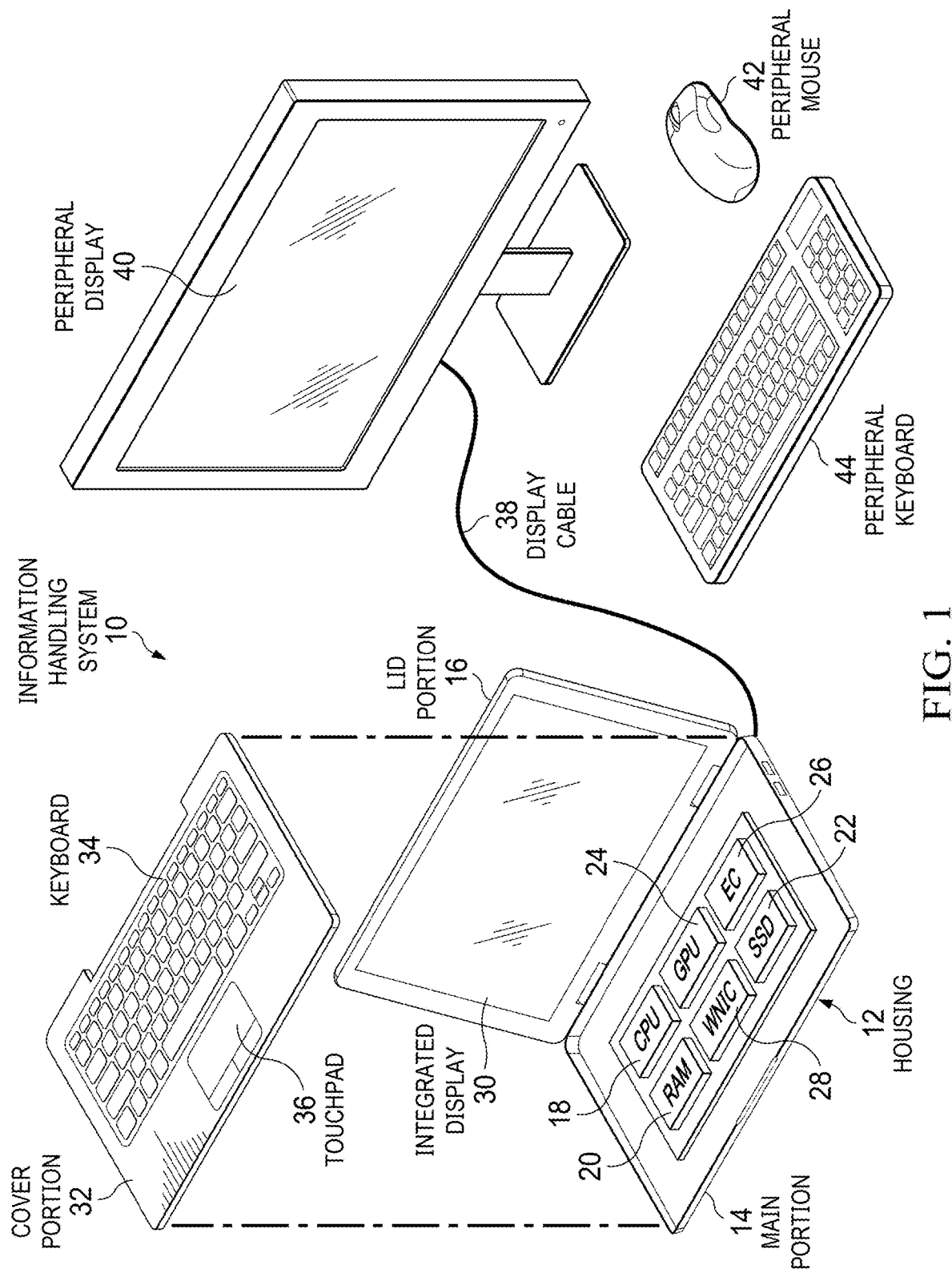
FIG. 1 depicts an exploded perspective view of an information handling system interfaced with an integrated keyboard and a peripheral keyboard that have back light key illumination.

Referring now to FIG. 1, an exploded perspective view depicts an information handling system 10 interfaced with an integrated keyboard 34 and a peripheral keyboard 44 that have back light key illumination. In the example embodiment, information handling system 10 is built in a portable housing 12 having a main portion 14 rotationally coupled to a lid portion 16 in a convertible configuration to open and close. Processing components coupled in main portion cooperate to process information, such as a central processing unit (CPU) 18 that executes instructions in cooperation with a random access memory (RAM) 20 that stores the instructions and information. A solid state drive (SSD) 22 has persistent storage that stores information and instructions when the system powers down, such as an operating system and applications that execute as instructions on CPU 18. A graphics processing unit (GPU) 24 further processes information to define visual images for presentation at a display. An embedded controller executes firmware instructions stored in non-transitory memory, such as flash, to manage operating conditions in the housing, such as application of power, maintaining thermal constraints and interacting with input/output (I/O) devices. A wireless network interface controller (WNIC) 28 supports communication with external devices, such as through Ethernet, WIFI and BLUETOOTH. An integrated display 30 presents information as visual images, such as by scanning pixel values to display pixels.

A housing cover portion 32 couples over housing main portion and supports a keyboard 34 that accepts keyed inputs and a touchpad 36 that accepts touched inputs. For example, the keyed and touch inputs are communicated through embedded controller 26 to CPU 18. In addition to managing inputs of integrated I/O devices, embedded controller 26 manages external peripheral devices, such as a peripheral display 40 that receives visual image information through a display cable 38, a peripheral keyboard 44 and a peripheral mouse 42. In the example embodiment, integrated keyboard 34 and peripheral keyboard 44 can have a variety of enhancements to enhance end user interactions, such as backlight to illuminate key values in low ambient light conditions and a liquid crystal display to accept touch inputs at the keyboard. These features tend to increase power consumption associated with the keyboard. When a keyboard illumination is supported at an integrated keyboard, the extra power consumption drains the main system battery. When the keyboard illumination is supported by a peripheral keyboard, the relatively small battery within the keyboard tends to have a reduced charge life. In both cases, extra charging responsive to greater battery discharge tends to increase power use and carbon footprint.

Figure 2:
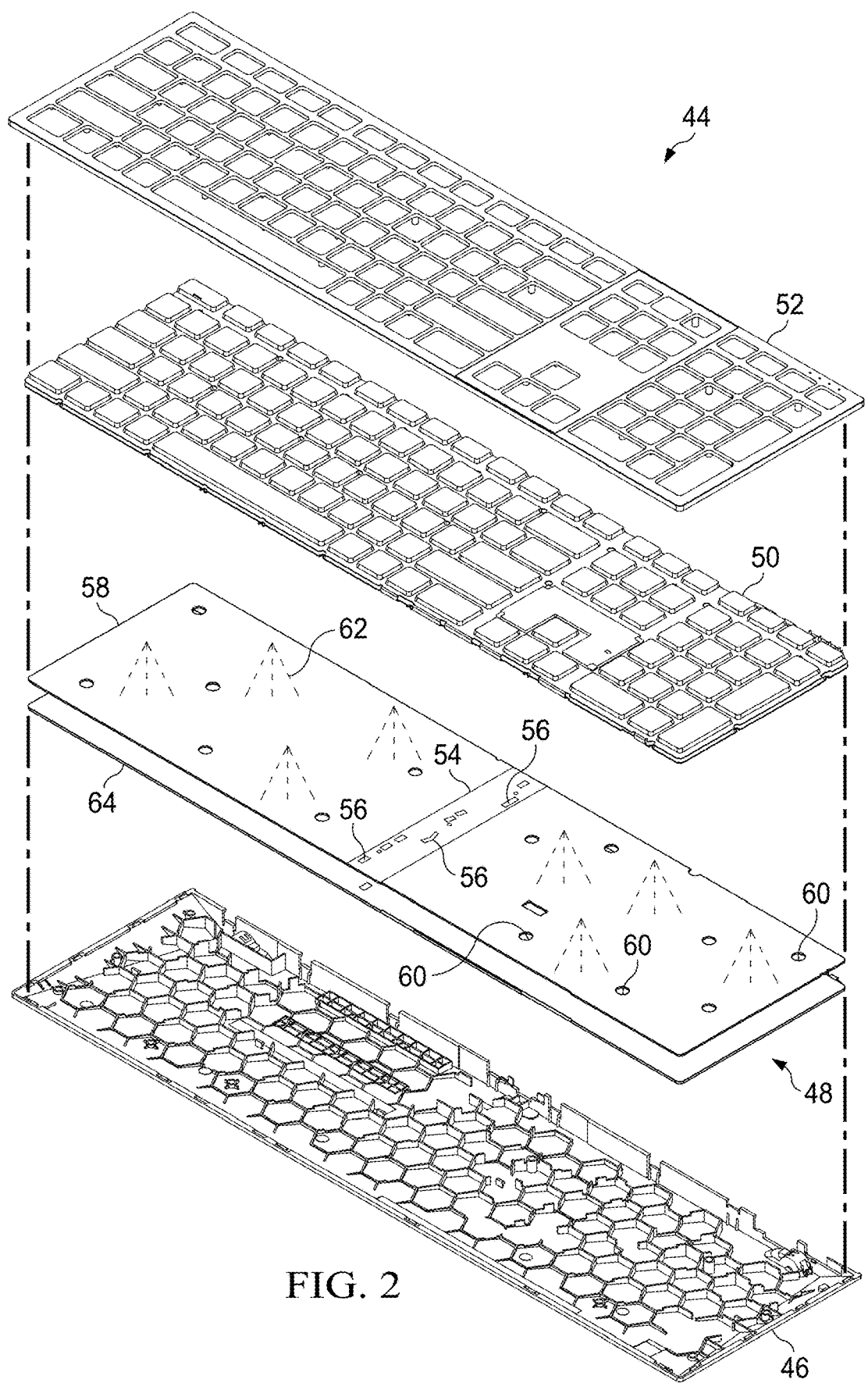
FIG. 2 depicts an exploded perspective view of a keyboard having a backlight and photovoltaic panel to capture misdirected illumination.

Referring now to FIG. 2, an exploded perspective view depicts a keyboard 44 having a backlight illumination source 48 and photovoltaic panel 64 to capture misdirected illumination. In the example embodiment, a key assembly 50 has plural keys and a sensor, such as a membrane with a matrix, that accept end user inputs as key touches that are communicated to an information handling system. The example embodiment has a peripheral keyboard format, however, other embodiments as described herein and below may include an integrated keyboard that couples into a portable information handling system housing. An upper frame 52 couples over key assembly 50 and to keyboard frame 46 to hold the assembly together, such as with snap couplers or screws. Below keyboard assembly 50, an illumination source 48 generates illumination directed up towards keys of keyboard assembly 50 so that illumination passes through translucent key values formed in the plural keys to illuminate the key values for better end user interactions. Illumination source 48 has a centrally located circuit board 54 with plural light emitting diodes 56 that generate light to enter a light spreader 58 having plural reflectors 60 to direct light towards the bottom surface of the plural keys. For example, light spreader 58 is an Acrylic or similar layer that extends as a plane below the area of the plural keys so that illumination is spread evenly across the underside of the plural keys. Some of the illumination labeled 62 is misdirected away from the plural keys and downward towards frame 46. This downward directed illumination may include light that reflects against the bottom surface of the plural keys without entering translucent areas that pass light through as key values. In some embodiments, the bottom surface of the plural keys may have a reflective surface to direct unused light that does not pass through the key value in downward direction.

A photovoltaic panel 64 is coupled below illumination source 48 to have substantially the same shape as light spreader 58 so that light misdirected from the keyboard bottom surface is converted by photovoltaic panel 64 into a current to charge a battery of keyboard 44. In the example embodiment, light spreader 58 and photovoltaic panel 64 have substantially equal footprints that match the area of keyboard assembly 50 underside. Light spreader 58 has an area that provides an even distribution of light through each of the plural keys. Photovoltaic panel 64 has an area that accepts light traveling downward and, in one alternative embodiment, can include raised sides to collect light at the perimeter of light spreader 58. In one example embodiment, photovoltaic panel 64 is an EXEGER POWERFOYLE INDOOR V3.0 dye-Sensitized Solar Cell. In alternative embodiments, other types of thin-film solar cells may be used that deposit semiconductor materials on glass or plastic substrates, such as gallium arsenide, cadmium telluride, copper indium disulphide, copper indium gallium diselenide, and methyl-ammonium-lead-iodide (Perovskite). These thin film modules absorb light up to 100 times more effectively than conventional materials, such as silicon. The photovoltaic panel replaces the reflector that conventional keyboards place under a light spreader so that, rather than attempting to minimize light generation with reflectors to reflect misdirected light towards the keys, the present disclosure minimizes total power consumption by converting misdirected light into current. In one example embodiment, no reflectors are used in the keyboard or under the light spreader. In another example embodiment, reflectors are only used to direct light towards the photovoltaic panel and not towards the keyboard underside, such as by including a reflective surface on the key underside with reflective paint or other treatments. The goal of the arrangement is to recycle as much light as possible as a current while relying upon very controllable direct illumination towards the key underside to pass a desired amount of illumination through the key translucent symbol.

Figure 3:
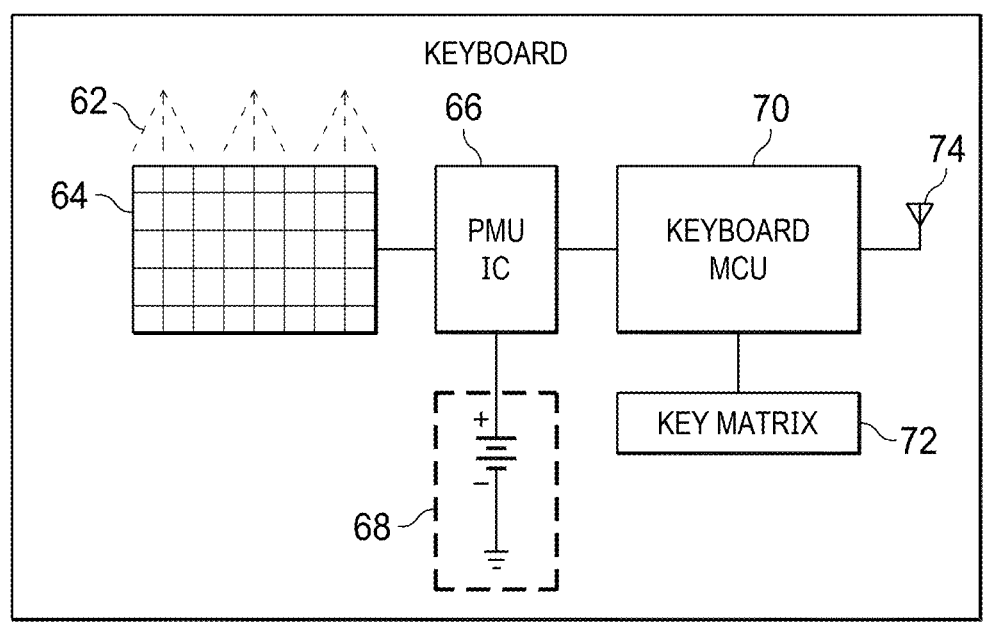
FIG. 3 depicts a circuit block diagram of a system for recycling keyboard backlight illumination as a current to charge a battery.

Referring now to FIG. 3, a circuit block diagram depicts a system for recycling keyboard backlight illumination as a current to charge a battery 68. Keyboard 44 accepts key inputs at a key matrix 72, such as with a touch by a key on a membrane to close a circuit, and communicates the input with keyboard microcontroller unit (MCU) 70 or other processing resource through a radio 74. As an example, keyboard MCU is an ARM-based or similar system on chip (SOC) that includes non-transitory memory and a radio to support BLUETOOTH communication. Photovoltaic panel 64 is coupled under the keyboard so that it collects illumination 62 that is not directed towards the keyboard keys and converts the illumination to a current. A power management unit (PMU) integrated circuit 66 receives the current from photovoltaic panel 64 and applies the current to charge a battery 68. In one example embodiment, battery 68 is a small lithium ion battery coupled in the keyboard to operate the keyboard as a separate peripheral device. In an alternative embodiment, battery 68 is a portable information handling system battery that operates the system under the management of an embedded controller, such as when the keyboard couples into a portable housing of a portable information handling system.

Figure 4:
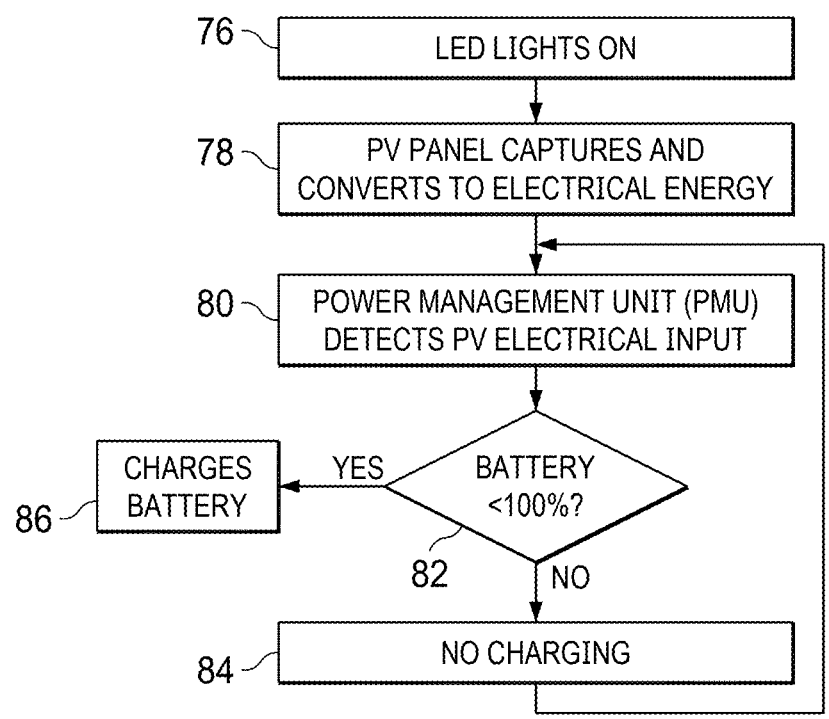
FIG. 4 depicts a flow diagram of a process for charging a battery with illumination of a keyboard backlight.

Referring now to FIG. 4, a flow diagram depicts a process for charging a battery with illumination of a keyboard backlight. The process starts at step 76 with LEDs of the backlight turned on to generate illumination towards the keyboard key underside. At step 78, the photovoltaic panel captures the illumination that is misdirected away from the keyboard underside and converts the illumination to current. At step 80, a power management unit (PMU) detects the photovoltaic electrical current input. At step 82, the PMU determines if the battery is less than 100% charged. When the battery is less than 100% charged, the process continues to step 86 to charge the battery. When the battery is fully charged, the process continues to step 84 to decline a battery charge and returns to step 80 to monitor current available to the PMU for charging the battery.

Figure 5:
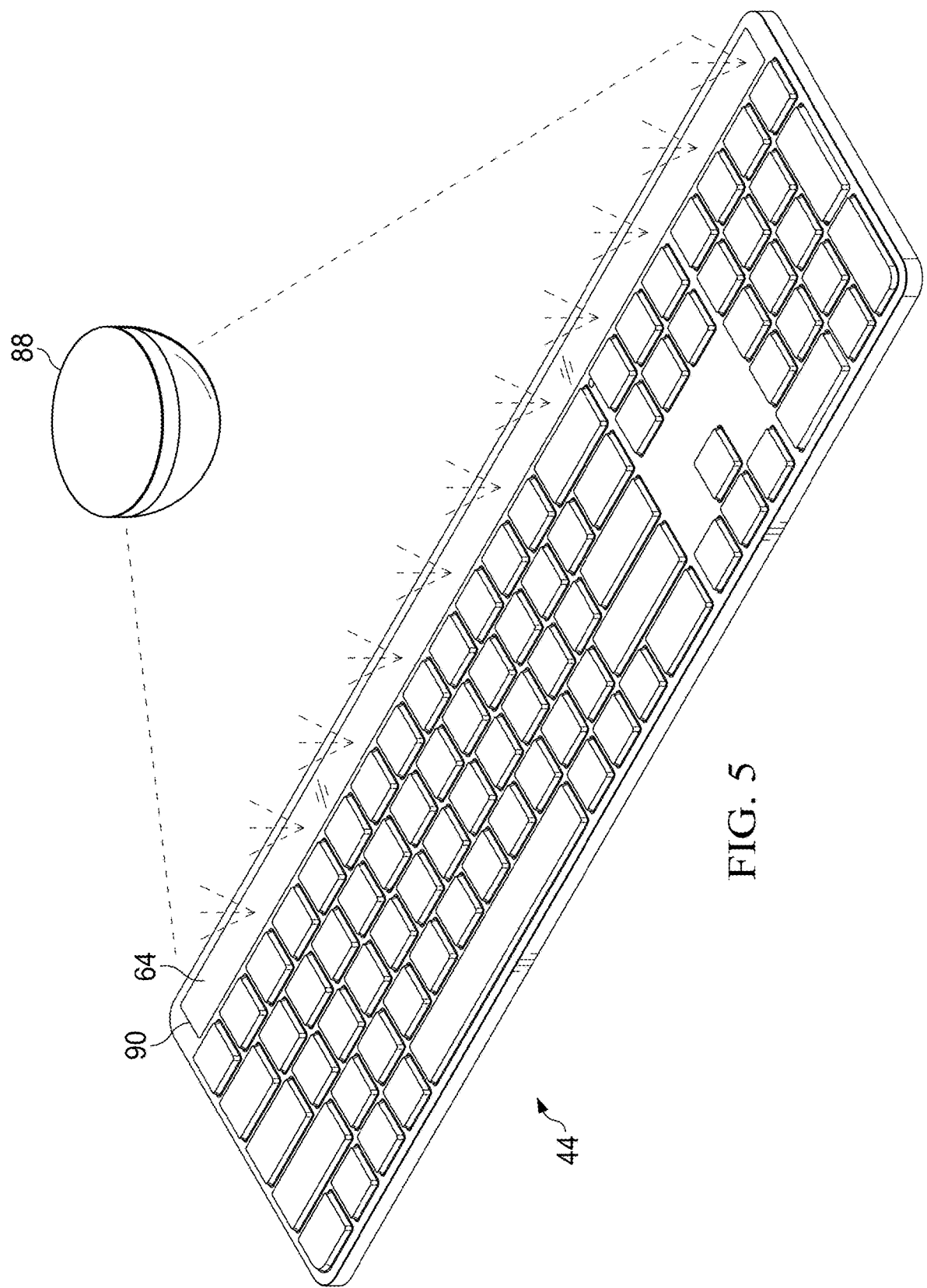
FIG. 5 depicts an upper perspective view of a keyboard having a liquid crystal display (LCD) panel at a keyboard upper surface having a photovoltaic glass panel coupled over the LCD panel.

Referring now to FIG. 5, an upper perspective view depicts a keyboard 44 having a liquid crystal display (LCD) panel 90 at a keyboard upper surface having a photovoltaic glass panel 64 coupled over the LCD panel. In the example embodiment, photovoltaic glass panel 64 generates a current to recharge a battery as shown in FIG. 3, however, the light that generates the current originates from both internal illumination generated by LEDs that backlight the LCD and also from ambient light 88 that is generated external the keyboard. Photovoltaic panel 64 is a semi-transparent photovoltaic material deposited on one side of a glass cover to capture and convert light energy from the LCD panel and ambient light into a current. In the example embodiment, a touch detection functionality is included with LCD panel 90, such as included in a separate glass cover of the LCD panel or included in photovoltaic glass panel 64 on a side opposite the side having the photovoltaic material. Alternatively, the photovoltaic panel and touch detection may be included on separate pieces of glass that are glued together with an optically clear adhesive and placed over the LCD panel.

Figure 6:
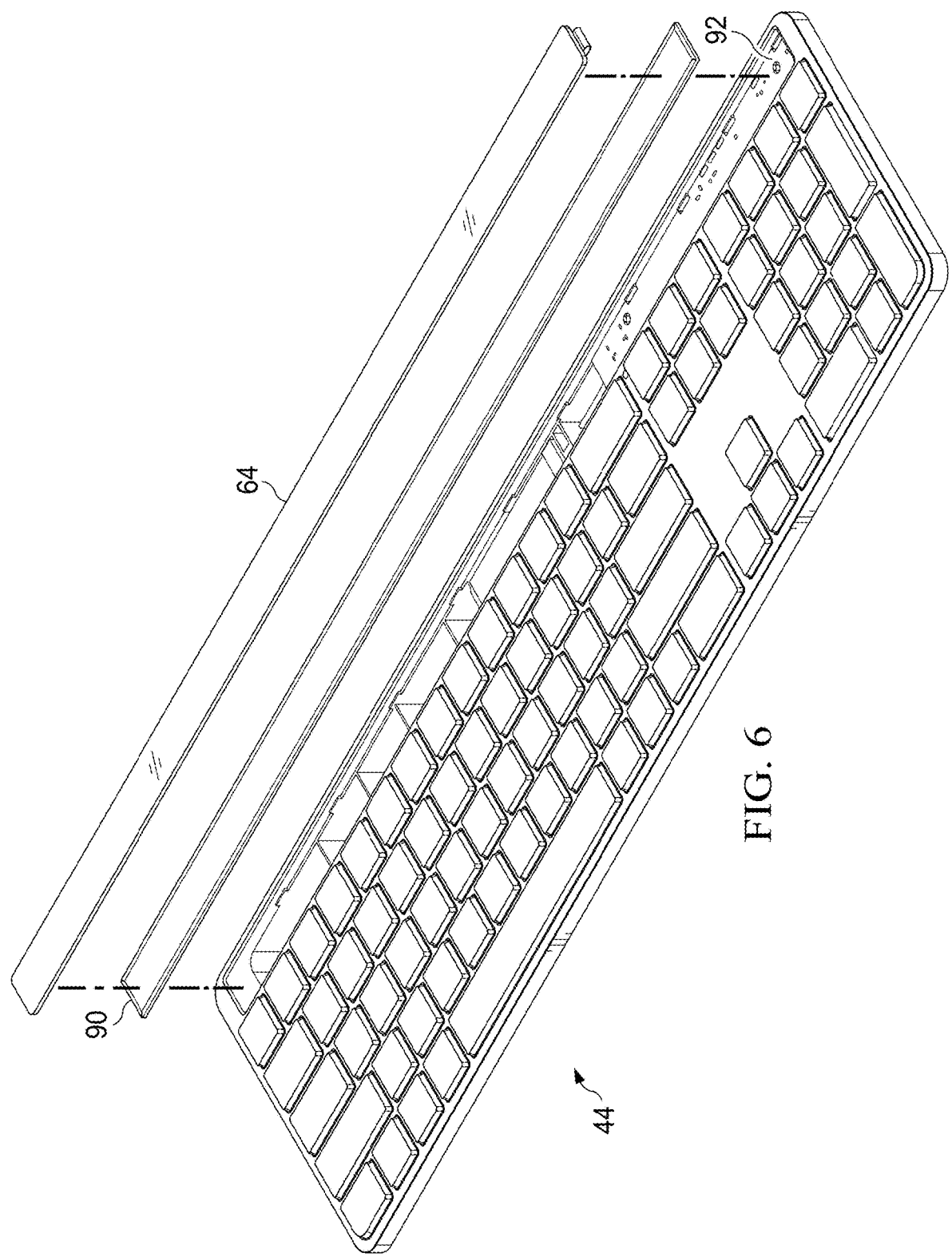
FIG. 6 depicts an upper perspective exploded view of a keyboard having the LCD panel configured to accept key inputs through a photovoltaic panel.

Referring now to FIG. 6, an upper perspective exploded view depicts a keyboard 44 having the LCD panel 90 configured to accept key inputs through a photovoltaic panel 64. In the example embodiment, a processing resource coupled to a circuit board 92 generates visual images at LCD panel 90 to support end user input selections, such as by presenting a function row with keys F1 through F12 and related keys that have assignable values. Photovoltaic panel 64 includes a touch detection surface that accepts touches at depicted function keys, which are interpreted as inputs by the processing resource on circuit board 92. Circuit board 92 includes the processing resources as depicted in FIG. 3 and described above. A PMU integrated circuit interfaces with photovoltaic panel 64 to convert current from the photovoltaic panel into charge applied to the battery. In various embodiments, the selection of the type of material for the photovoltaic panel is related to the selection of colors presented by the LCD panel. For example, photovoltaic panel 64 is selected to capture ambient light that might focus on wavelengths associated with typical indoor lighting color temperatures while other color temperatures experience less deprecation when passing from LCD panel 90 through the semi-transparent photovoltaic panel. To ensure adequate contrast in the LCD visual images, the color presented from the visual image is selected based upon a relative absorption through the photovoltaic panel. As an example, an optical notch filter from liquid crystal chiral polymers could be used, as described in "Optical Filters Based on Cholesteric, Blue and Sphere Mesophases," by Sun et al., of the National Engineering Lab for TFT-LCD Materials and Technologies. An additional advantage of this spectrum selection is that ambient light absorbed by the photovoltaic panel does not reflect back at the end user and deteriorate viewing of the underlying image.

Figure 7:
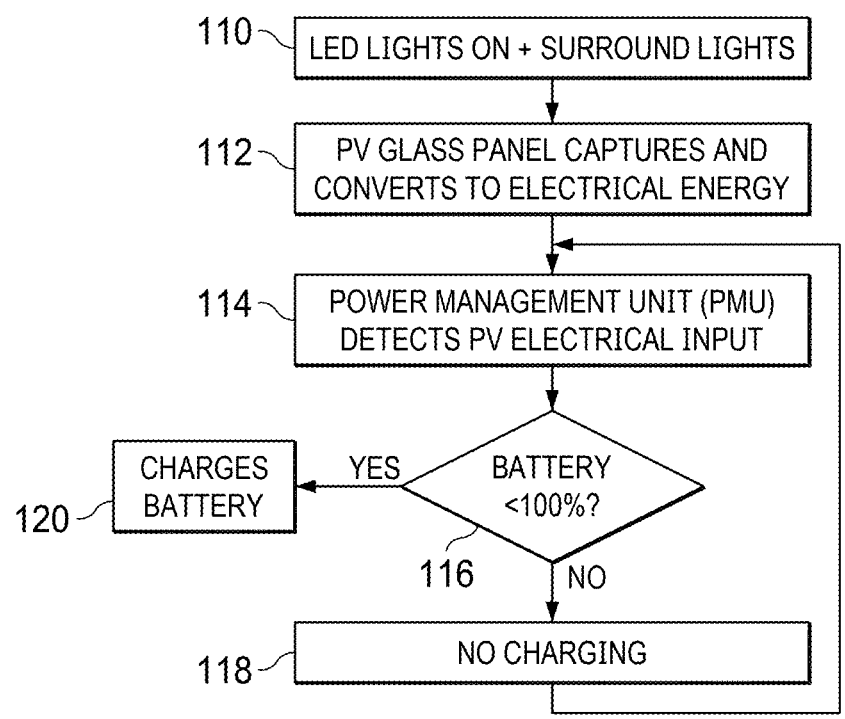
FIG. 7 depicts a flow diagram of a process for charging a battery with illumination of a keyboard LCD panel and with ambient light.

Referring now to FIG. 7, a flow diagram depicts a process for charging a battery with illumination of a keyboard LCD panel and with ambient light. The process starts at step 110 with LEDs of the backlight turned on to generate illumination towards the LCD at the keyboard key underside. In addition, ambient light is absorbed that impacts the photovoltaic panel from above and exterior the keyboard. At step 112, the photovoltaic panel captures the illumination that impacts from above and below and converts the illumination to current. In one example embodiment, the photovoltaic panel has a semi-transparent material with light absorption greater in an ambient light spectrum, such as the blue light spectrums used in typical ambient LED lighting, while having less absorption of visual light spectrums output by the LCD and emphasized to enhance LCD contrast for visual images presented through the photovoltaic panel. At step 114, a power management unit (PMU) detects the photovoltaic electrical current input. At step 116, the PMU determines if the battery is less than 100% charged. When the battery is less than 100% charged, the process continues to step 120 to charge the battery. When the battery is fully charged, the process continues to step 118 to decline a battery charge and returns to step 114 to monitor current available to the PMU for charging the battery.

Figure 8:
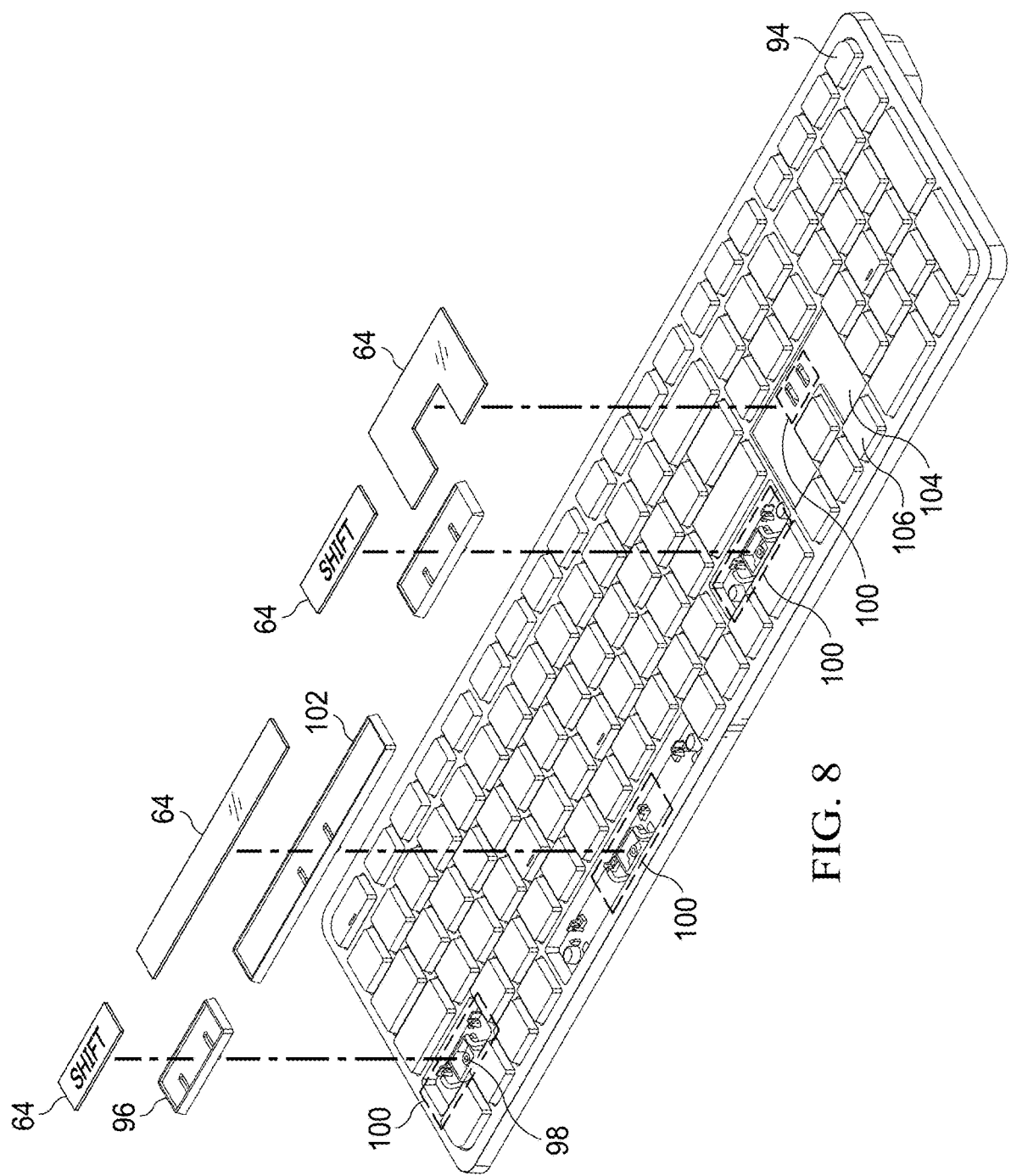
FIG. 8 depicts an upper perspective view of a keyboard having photovoltaic panels included in keyboard keys to charge the keyboard battery with current generated by ambient light.

Referring now to FIG. 8, an upper perspective view of a keyboard 44 depicts photovoltaic panels 64 included in keyboard keys 94 to charge the keyboard battery with current generated by ambient light. In the example embodiment, four photovoltaic panels 64 are included on keyboard 44 to generate current that charges the keyboard battery. The number and location of photovoltaic panels may vary depending on projected keyboard battery use and projected charge generation from the photovoltaic panels. For instance, a peripheral keyboard may include only four photovoltaic panels that will, in a typical office environment, generate each day the amount of power that the keyboard uses. In such an example embodiment, the battery charge size may be reduced to a minimalist amount, such as 5 days of operating charge, so that a smaller battery is included in the keyboard resulting in a reduced carbon footprint not only from reduced charging but also reduced battery material. On the other hand, a keyboard integrated in a portable information handling system and powered by the battery of the system may include a photovoltaic panel on each key so that the main battery receives a charge from a maximal available green current. In the example peripheral keyboard, the areas selected for use of photovoltaic panels include the largest surface areas so that fewer total numbers of photovoltaic panels are included.

In the example embodiment a photovoltaic panel 64 couples to each shift key 96, to a space key 102 and to an open keyboard area 104 located above and to each side of arrow keys 106. The current generated from photovoltaic panels 64 is communicated through openings in the keys or the keyboard cover to a photovoltaic contact 100 located proximate a rubber dome 98 that biases the key to a raised position. Photovoltaic contacts 100 are, for instance, a contact spring that couples the current contacts of the photovoltaic panel with the charging circuit, such as the circuit block diagram described in FIG. 3. In one example embodiment, a small opening in the photovoltaic panel is made at a symbol of the key, such as "shift" written on the shift key, so that backlight can pass through to illuminate the key value for an end user. Alternatively, a semitransparent photovoltaic panel permits light from the backlight to pass through at the light spectrum of the backlight. In another alternative embodiment, an OLED impression of the symbol illuminates above the photovoltaic panel to highlight the symbol with active illumination powered through the photovoltaic contacts.

Figure 9:
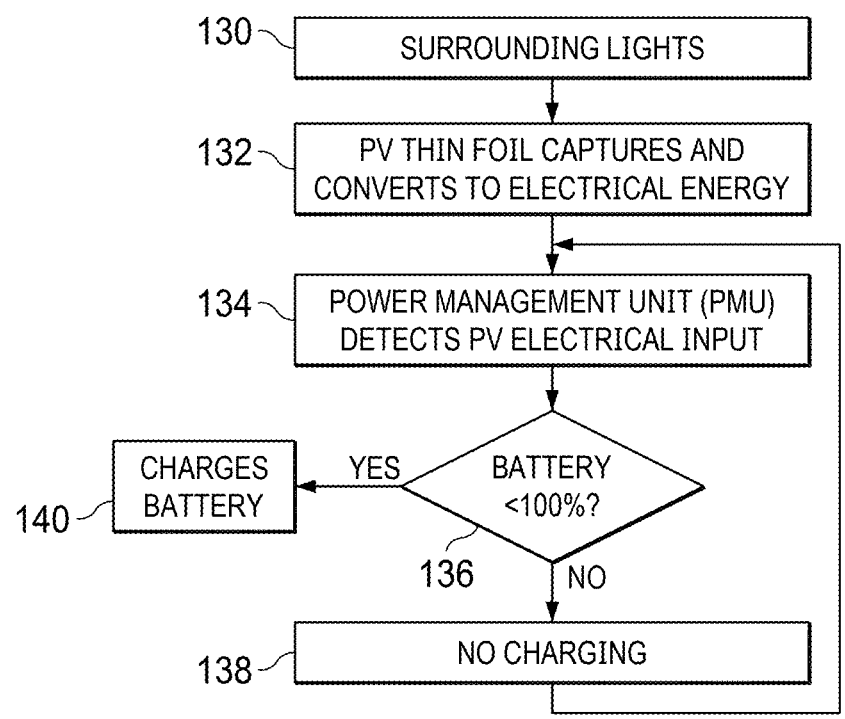
FIG. 9 depicts a flow diagram of a process for charging a battery with ambient light.

Referring now to FIG. 9, a flow diagram depicts a process for charging a battery with illumination of ambient light. The process starts at step 130 with ambient light absorbed that impacts the photovoltaic panel from above and exterior the keyboard. At step 132, the photovoltaic panel captures the illumination that impacts from above and exterior the keyboard and converts the illumination to current. In one example embodiment, the photovoltaic panel has a semi-transparent material with light absorption greater in an ambient light spectrum, such as the blue light spectrums used in typical ambient LED lighting, while having less absorption of visual light spectrums output by a backlight that illuminates key values from below the keyboard. At step 134, a power management unit (PMU) detects the photovoltaic electrical current input. At step 136, the PMU determines if the battery is less than 100% charged. When the battery is less than 100% charged, the process continues to step 140 to charge the battery. When the battery is fully charged, the process continues to step 138 to decline a battery charge and returns to step 134 to monitor current available to the PMU for charging the battery.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
a processor coupled in the housing and operable to execute instructions to process information;
a memory coupled in the housing and interfaced with the processor, the memory operable to store the instructions and information;
an embedded controller interfaced with the processor and configured to manage inputs from input devices; and
a keyboard interfaced with the embedded controller, the keyboard having plural keys to accept end user inputs and a processing resource to communicate the end user inputs to the embedded controller, the keyboard further having an illumination source to generate illumination under the keys, a light spreader to distribute the illumination towards the keys and a photovoltaic panel under the light spreader to convert light directed from light spreader away from the plural keys into an electrical current.

2. The information handling system of claim 1 further comprising:
a battery coupled in the keyboard and interfaced with the keyboard processing resource to power the keyboard processing resource; and
a power management unit interfaced with the photovoltaic panel and the battery to charge the battery with the electrical current.

3. The information handling system of claim 2 wherein the plural keys have a reflective bottom surface.

4. The information handling system of claim 2 further comprising:
a keyboard frame separate from the housing, the plural keys, illumination source, light spreader and photovoltaic panel coupled in the keyboard frame; and
a radio interfaced with the processing resource to communicate end user inputs from the keyboard to the processor.

5. The information handling system of claim 4 wherein the illumination source comprises a circuit board having plural light emitting diodes (LEDs) and coupled in a central region of the light spreader.

6. The information handling system of claim 5 wherein the photovoltaic panel comprises copper indium diselenide.

7. The information handling system of claim 5 wherein the photovoltaic panel comprises methyl-ammonium-lead-iodide.

8. The information handling system of claim 1 further comprising:
a battery coupled in the housing interfaced with the processor and the keyboard processing resource to power the processor and the keyboard processing resource; and
a power management unit interfaced with the photovoltaic panel and the battery to charge the battery with the electrical current.

9. The information handling system of claim 8 wherein the housing is configured as a portable housing and the keyboard couples into the housing at an upper surface.

10. A method for illumination of an information handling system keyboard, the method comprising:
generating the illumination with an illumination source below plural keys of the keyboard;
spreading the illumination across the bottom surface with a light spreader; and
converting the illumination to a current with a photovoltaic panel coupled below the light spreader.

11. The method of claim 10 further comprising:
interfacing a power management unit with the photovoltaic panel to accept the current; and
charging a battery with current, the battery powering the generating the illumination.

12. The method of claim 11 further comprising reflecting light from a bottom surface of the plural keys through the illumination spreader and against the photovoltaic panel.

13. The method of claim 11 further comprising:
coupling the plural keys, the illumination source, the light spreader and the photovoltaic panel in a keyboard frame; and
communicating key inputs made at the plural keys to an information handling system with a radio coupled in the keyboard frame.

14. The method of claim 13 further comprising:
coupling a circuit board having plural LEDs to a central region of the light spreader to perform the generating the illumination; and
directing illumination from the LEDs into the light spreader.

15. The method of claim 11 further comprising:
coupling the plural keys, the illumination source, the light spreader and the photovoltaic panel into a portable information handling system housing; and
charging the battery with the current that powers a processor of the portable information handling system.

16. A keyboard comprising:
plural keys to accept end user inputs;
a processing resource to communicate the end user inputs to an information handling system;
an illumination source to generate illumination under the plural keys;
a light spreader to distribute the illumination towards the plural keys; and
a photovoltaic panel under the light spreader to convert light directed from light spreader away from the plural keys into an electrical current.

17. The keyboard of claim 16 further comprising:
a keyboard frame, wherein the plural keys, illumination source, light spreader and photovoltaic panel couple in the keyboard frame; and
a radio interfaced with the processing resource to communicate end user inputs to the plural keys to the information handling system.

18. The keyboard of claim 17 further comprising:
a battery coupled in the keyboard and interfaced with the keyboard processing resource to power the keyboard processing resource; and
a power management unit interfaced with the photovoltaic panel and the battery to charge the battery with the electrical current.

19. The keyboard of claim 18 wherein the illumination source comprises a circuit board having plural light emitting diodes (LEDs) and coupled in a central region of the light spreader.

20. The keyboard of claim 19 wherein the photovoltaic panel comprises copper indium gallium selenide.

* * * * *